(No Model.)

L. C. McNEAL.
FRUIT KNIFE.

No. 379,238. Patented Mar. 13, 1888.

Attest:
Geo. T. Smallwood.
Jas. K. McCathran.

Inventor:
L. C. McNeal.
By E. B. Whitmore,
atty.

UNITED STATES PATENT OFFICE.

LUTHER C. McNEAL, OF ROCHESTER, NEW YORK.

FRUIT-KNIFE.

SPECIFICATION forming part of Letters Patent No. 379,238, dated March 13, 1888.

Application filed February 28, 1887. Serial No. 229,135. (No model.)

*To all whom it may concern:*

Be it known that I, LUTHER C. McNEAL, of Rochester, in the county of Monroe and State of New York, have invented a new and useful Improvement in Fruit-Knives, which improvement is fully set forth in the following specification and shown in the accompanying drawings.

The object of my invention is to produce an improved fruit-knife, the blade being formed with parts by means of which the thick rind of oranges and similar fruit may be more easily removed, the invention being hereinafter fully described, and more particularly pointed out in the claims.

Figure 1:
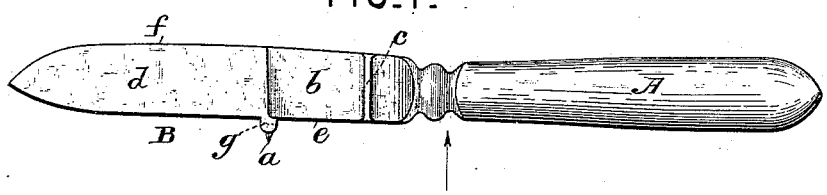
Figure 2:
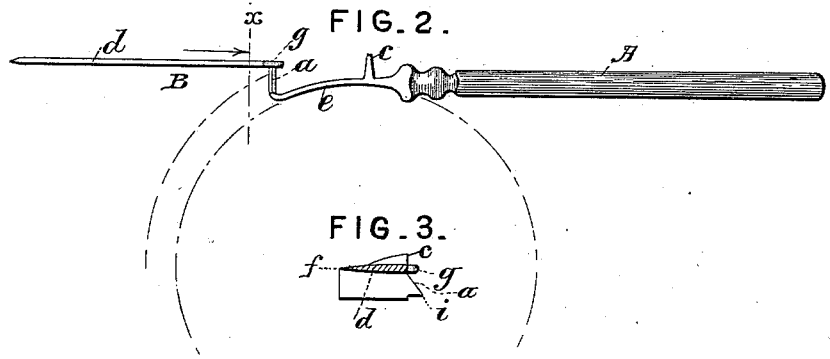
Figure 3:
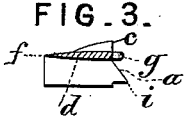
Figure 4:
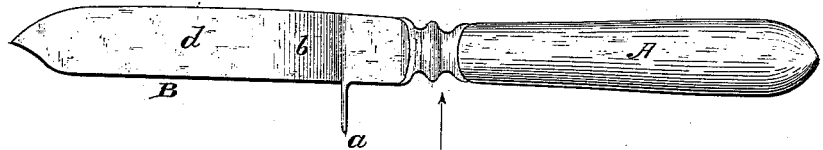
Figure 5:
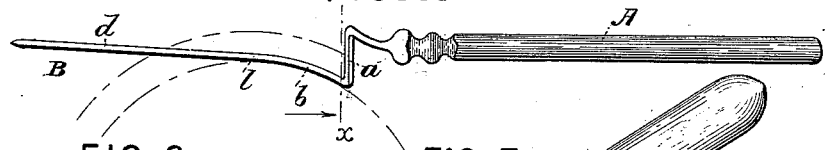
Figure 6:
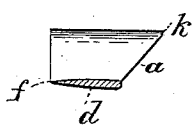
Figure 7:
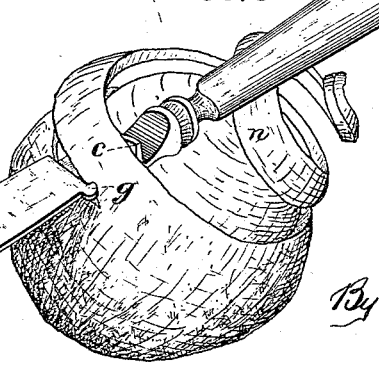

Referring to the drawings, Figures 1 and 4 show plans of similar but differently-formed blades formed in accordance with my invention. Figs. 2 and 5 show the knife seen as indicated by the arrows associated with the respective Figs. 1 and 4. Figs. 3 and 6 show the blade sectioned, as on the dotted lines $x$ in the respective Figs. 2 and 5, and viewed as indicated by the respective arrows pointed on said dotted lines; and Fig. 7 is a perspective view serving to show the application of the knife.

Referring to the parts of the device, A represents the handle of the knife, which is of common form, and B the blade as a whole, the form of which blade constitutes my invention. The blade, as shown in the several forms, is constructed with a part, $b$, made slightly curved to conform to the convexity of the sphere of fruit to be peeled, said part $b$ forming a separator for the rind and fruit. The blade is further formed with a short cutting-edge or cutter, $a$, which serves to divide the rind into a strip, $n$, as it is being taken from the fruit. The blade B is further formed, when it is required, with a straight part, $d$, extending beyond the part $b$ near to and substantially parallel with the axis of the handle, which straight part $d$, however, is of minor importance.

The essential part of the invention is the part $b$, preferably curved laterally and formed with a dull rounded edge to pass under the rind to separate it from the meat of the fruit, combined with the cutter $a$ to divide the rind. The straight part $d$ of the blade when added is made flat and the same in form as that of a common fruit-knife, the cutting-edge being at $f$.

$g$ is a flat part of the blade extending over the cutter $a$, forming a guard to protect said edge, and also to prevent the spray of juice produced when the rind is cut from being projected upon the hands and clothing of the person using the knife.

$c$ is a gage projecting upward from the part $b$ of the blade substantially parallel with the plane of the cutter $a$, which serves to regulate the width of the strip of peel removed, its use being clearly shown in Fig. 7.

In the form shown in Figs. 1 and 2 the part $b$ is between the cutter $a$ and the handle, while in the form shown in Figs. 4 and 5 the part $b$ is between the cutter and the straight part $d$ of the blade, said straight part $d$ forming a tangent to said part $b$.

The cutter $a$ may be formed to have its cutting-edge at right angles with the line of its advance when urged through the rind; or the point $i$, Fig. 3, may be in advance and project under the rind; or, if found desirable, the upper point, $k$, Fig. 6, may be in advance.

The edge $e$ of the part $b$ is preferably made dull and rounded, as a sharp edge is not necessary to part the rind from the edible part of the fruit. The design is not to pierce or break the inner tender skin of the fruit while removing the rind, which skin, if pierced, would allow the inner juice to flow. To prevent this skin being pierced, the lower part, $i$, of the cutter is slightly raised above the surface of the part $b$, which is in contact with said skin.

Should the device in any case be intended for peeling thick-skinned fruit only, the straight part $d$ of the blade may be omitted entirely in manufacturing the knife.

What I claim as my invention is—

1. In combination with a handle, the blade of a fruit-knife formed with a separating part, $b$, the plane of which is substantially parallel with the axis of said handle, a cutter, $a$, joined to one end of said part $b$, the planes of said parts $b$ and $a$ forming an angle, and a guard for said cutter projecting at the end thereof and substantially at right angles therewith.

2. In combination with a handle, the blade of a fruit-knife formed with a separating part or separator, $b$, the plane of which is substantially parallel with the axis of said handle, a cutter joined to one end of said part $b$, the planes of said part $b$ and said cutter forming an angle, and a gage for said cutter at the opposite end of said separator from said cutter, and projecting from the same side of said separator with said cutter and parallel therewith.

3. In combination with a handle, the blade of a fruit-knife formed with a separator, $b$, the plane of which is substantially parallel with the axis of said handle, and a cutter joined to one end of said part $b$, the planes of said part $b$ and said cutter forming an angle, the end of the cutting-edge of said cutter adjacent to said part $b$ being above the surface of said part $b$ out of contact with the meat of the fruit, for the purpose set forth.

LUTHER C. McNEAL.

Witnesses:
E. B. WHITMORE,
M. L. McDERMOTT.